April 11, 1944. J. M. HAIT 2,346,426
FLEXIBLE ROTARY DRIVE COUPLING
Filed Oct. 30, 1941
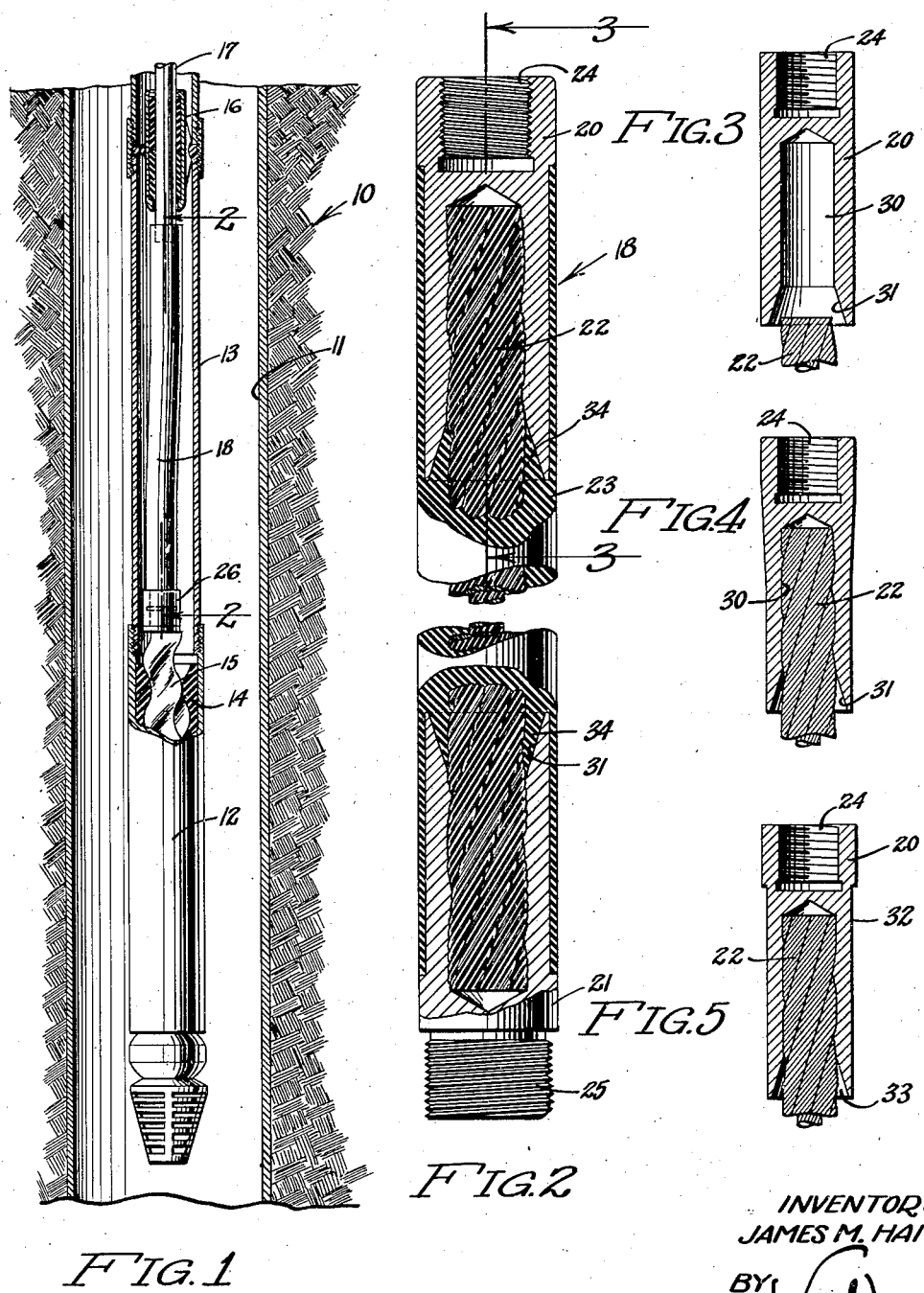
INVENTOR:
JAMES M. HAIT
BY
ATTORNEY Patented Apr. 11, 1944

2,346,426

UNITED STATES PATENT OFFICE 2,346,426

FLEXIBLE ROTARY DRIVE COUPLING

James M. Hait, San Gabriel, Calif., assignor to Food Machinery Corporation, San Jose, Calif., a corporation of Delaware Application October 30, 1941, Serial No. 417,003

4 Claims. (Cl. 287—75)

This invention relates to flexible rotary drive couplings and is of special utility in connecting the rotor of a Moineau pump with the shaft for driving the same.

It is an object of my invention to provide an improved flexible rotary drive coupling.

It is another object of my invention to provide such a coupling which will have a relatively long life.

It is yet another object of my invention to provide such a coupling which is suitable for operation under water as when driving a Moineau pump.

A further object of the invention is to provide such a coupling which is adapted for sustaining a high tension load as well as a high torque load.

A yet further object of the invention is to provide a deep well pump of the Moineau type in which power is relatively smoothly and efficiently transmitted to the rotor of the pump.

The manner of accomplishing the foregoing objects, as well as further objects and advantages, will be made manifest in the following description taken in connection with the accompanying drawing, in which:

Fig. 1 is a diagrammatic sectional view of a portion of a deep water well illustrating a Moineau pump installation therein, portions thereof being broken away to show the use of a preferred embodiment of the coupling of the present invention employed for connecting the rotor of the pump with the drive shaft.

Fig. 2 is an enlarged cross sectional view of the flexible rotary drive coupling shown in Fig. 1.

Figs. 3, 4 and 5 are diagrammatic views illustrating successive steps in the manufacture of the coupling of the invention.

Fig. 3 shows one of the coupling heads and one end of the cable employed in the coupling in readiness to be inserted into the socket in said head.

Fig. 4 shows the next following step in the manufacture of the coupling of the invention in which the socket portion of the head is swedged down into gripping engagement with the cable end inserted into the socket.

Fig. 5 illustrates the next following step in the manufacture of the coupling of the invention in which the socket portion of the coupling head is turned down to a uniform diameter in preparation for receiving a jacket of rubber.

Referring specifically to the drawing, Fig. 1 illustrates a well 10 provided with a casing 11 and a Moineau pump 12 installed in said well, this pump being attached to the lower end of a string of pump tubing 13. The pump 12 includes a stator 14 and a rotor 15. The pump tubing 13 is provided with a series of bearings 16 in which is journalled a line shaft 17, the lower end of the latter being connected to the rotor 15 by a flexible rotary drive coupling 18 which constitutes a preferred embodiment of the coupling of the present invention.

The construction of the coupling 18, after the manufacture of this has been completed, is shown in Fig. 2, but this construction can best be understood by describing the process by which it is manufactured. As noted in Fig. 2, the main elements of the coupling 18 comprise upper and lower heads 20 and 21, a section of heavy wire cable 22 and a rubber jacket 23. The head 20 has an internally threaded receptacle 24 to permit its attachment to the lower end of the shaft 17. The head 21 has an externally threaded member 25 which is adapted to be screwed in to the upper end of a sleeve 26, by which the lower end of the coupling 18 is connected to the pump rotor 15. Other than these differences, the heads 20 and 21 are identical, these heads being preferably made of mild steel.

The heads 20 and 21 are assembled with the cable 22 in the same manner so that the illustration in Figs. 3, 4 and 5 of the assembling of the head 20 with the cable 22 will suffice for both. As noted in Fig. 3, the head 20 is first made of uniform outside diameter throughout its length, the lower portion of this providing a socket 30 having an internally bevelled mouth 31. The section of cable 22 is preferably a steel rope with independent wire rope core, regular lay, 6 x 19. Before the section 22 is cut from the main body of the cable, the wires of the cable are preferably brazed together so that when the section 22 is cut out from the main body of the cable, the strands of section 22 adjacent the ends thereof are thus brazed together.

In assembling the cable section 22 with the head 20, a brazed end of this cable section is inserted into the socket 30 and this socket is then swedged downwardly into intimate gripping contact with the cable, as shown in Fig. 4. Following this swedging operation, the outer surface of the socket 30 of the head 20 is turned down to a uniform diameter to provide a rubber sleeve seat 32. It is to be noted that the swedging operation still leaves a space 33 between the bevelled mouth 31 of the socket 30 and the cable 22.

The next step in the manufacture of the flexible coupling 18 is to place the cable section 22 assembled as indicated in Fig. 5, with the head 20 (and with the head 21 assembled in a similar manner with the opposite end of the cable 22) into a rubber mold. This mold (not shown) has a cylindrical bore of the same diameter as the major outside diameters of the heads 20 and 21. A jacket 23 of rubber is now vulcanized onto the metal elements of the coupling so that this rubber is forced into the spaces 33 in the heads 20 and 21 and into the interstices of the cable 22 and into the space overlying the seat 32 so that when the vulcanization of the jacket 23 onto the metal parts of the coupling is complete, this jacket appears as shown in Fig. 2.

The conical wedges of rubber 34 which are forced into and vulcanized in the spaces 33 in the formation of the rubber jacket 23 serve an important mechanical function in the operation of the coupling 18 in cushioning the bending action of the strands of the cable 22 where this cable leaves the mouths 31 of the coupling heads 20 and 21. This cushioning effect operates to spread the bending strains to which these strands are subjected so as to effectively prevent the crystallization of these strands due to their bending in the operation of the coupling.

This cushioning action is of great importance in that when driving the pump 12 the coupling 18 must rotate at speeds of 1500 R. P. M. and higher under high torque and tension stresses.

The advantages of the coupling 18 of my invention when used in driving a Moineau pump in a deep well derive from the fact that this coupling is capable of sustaining, at high rotational speed, combined high torque and high tension loads while being subjected to misalignment of the drive and driven heads. These pumps operate under a head of water extending to the top of the well which is frequently as much as 400 feet deep. The rotor has to be supported by the coupling against this head of water and rotated to pump a stream of water upwards. When so rotated the pump rotor gyrates about the axis of the pump in the opposite direction from that in which its rotation occurs. The resulting misalignment of the drive and driven heads of the coupling constantly flexes the metal wire rope of the coupling adjacent each of the coupling heads. The rubber cushion, vulcanized to the rope and to the coupling heads and lying within the bevelled mouths of the rope sockets, resists the rope bending too sharply where this rope enters the head sockets and thus prolongs the life of the coupling.

What I claim is:

1. In a high-torque, high-tension flexible rotary drive coupling, the combination of: a section of heavy twisted steel wire rope having high torque and tension load transmitting factors; a pair of steel heads having high torque and tension load transmitting factors, said heads having axial sockets in which opposite ends of said rope are received and securely fastened; and means on said heads for transmitting simultaneously high torque and high tension loads through said coupling while said heads are misaligned.

2. In a high-torque, high-tension flexible rotary drive coupling, the combination of: a section of heavy twisted steel wire rope having high torque and tension load transmitting factors; a pair of steel heads having high torque and tension load transmitting factors, said heads having axial sockets which receive and are swedged into intimate binding relation with opposite ends of said rope; and means on said heads for transmitting simultaneously high torque and high tension loads through said couplings while said heads are misaligned.

3. In a high-torque, high-tension flexible rotary drive coupling, the combination of: a section of heavy twisted steel wire rope having high torque and tension load transmitting factors; a pair of steel heads having high torque and tension load transmitting factors, said heads having axial sockets in which opposite ends of said rope are snugly received and securely fastened, the mouths of said sockets being flared; means on said heads for transmitting simultaneously high torque and high tension loads through said coupling while said heads are misaligned; and a body of rubber encasing said rope and extending into said socket mouths and vulcanized to the head and rope surfaces contacted thereby.

4. In a high-torque, high-tension flexible rotary drive coupling, the combination of: a section of heavy twisted steel wire rope having high-torque and tension load-transmitting factors; a pair of steel heads having high-torque and tension load-transmitting factors, said heads having axial sockets in which opposite ends of said rope are received and securely fastened; means on said heads adapted to connect to rotary drive and driven members for transmitting simultaneously high-torque and high-tension loads through said coupling while said heads are misaligned; and a sealing jacket of rubber bonded to said cable and said heads to rotate tortuously therewith and prevent access of moisture to said cable.

JAMES M. HAIT.